United States Patent [19]

Burnet et al.

[11] Patent Number: 4,940,611
[45] Date of Patent: Jul. 10, 1990

[54] HARDENED, ENVIRONMENTALLY DISPOSABLE COMPOSITE GRANULES OF COAL CLEANING REFUSE, COAL COMBUSTION WASTE, AND OTHER WASTES, AND METHOD PREPARING THE SAME

[75] Inventors: George Burnet, Ames, Iowa; Ashok J. Gokhale, College Station, Tex.

[73] Assignee: Iowa State University Research Foundation, Inc., Ames, Iowa

[21] Appl. No.: 287,488

[22] Filed: Dec. 20, 1988

[51] Int. Cl.[5] ............................................. B32B 5/16
[52] U.S. Cl. ..................................... 428/2; 427/220; 428/403; 428/903.3
[58] Field of Search .................... 44/591, 592, 595; 427/220; 428/2, 403, 903.3

[56] References Cited

U.S. PATENT DOCUMENTS

| | | | |
|---|---|---|---|
| 3,356,469 | 12/1967 | Stephenson et al. | 44/602 |
| 3,902,435 | 9/1975 | Schuster | 110/222 |
| 3,910,775 | 10/1975 | Jackman | 44/13 X |
| 4,230,460 | 10/1980 | Maust, Jr. | 44/16 C |
| 4,234,632 | 11/1980 | Lubowitz | 428/2 |
| 4,352,856 | 10/1982 | Smillie | 428/403 X |
| 4,356,000 | 10/1982 | Chappell | 44/26 X |
| 4,395,265 | 7/1983 | Reilly et al. | 44/15 R X |
| 4,405,331 | 9/1983 | Blaustein et al. | 44/15 C X |
| 4,561,860 | 12/1985 | Gulley et al. | 44/589 |

FOREIGN PATENT DOCUMENTS 150908 9/1981 German Democratic Rep. .

OTHER PUBLICATIONS

G. Burnet, M. J. Murtha, and A. Gokhale, "Stabilization of Coal Cleaning Wastes", Fossil Energy Program Technical Progress Report, Oct. 1, 1984–Mar. 31, 1985, Prepared for Morgantown Energy Center, Morgantown, W.V., U.S. Dept. of Energy, Contract No. W-74-05-eng-82.

Primary Examiner—Henry F. Epstein
Attorney, Agent, or Firm—Zarley, McKee, Thomte, Voorhees and Sease

[57] ABSTRACT

A hardened, environmentally inert and disposable composite granule of coal cleaning refuse and coal combustion waste, and method for producing the same, wherein the coal combustion waste is first granulated. The coal cleaning refuse is pulverized into fine particles and is then bound, as an outer layer, to the granulated coal combustion waste granules. This combination is then combusted and sintered. After cooling, the combination results in hardened, environmentally inert and disposable composite granules having cores of coal combustion waste, and outer shells of coal cleaning refuse. The composite particles are durable and extremely resistant to environmental and chemical forces.

18 Claims, 1 Drawing Sheet

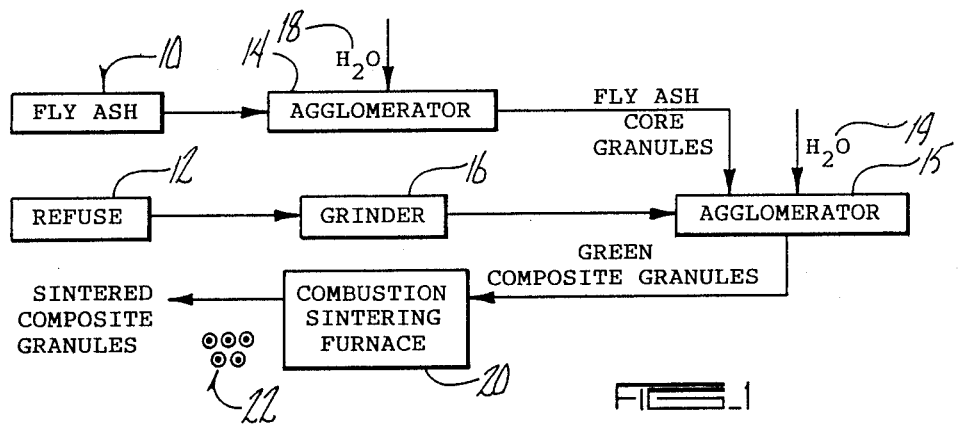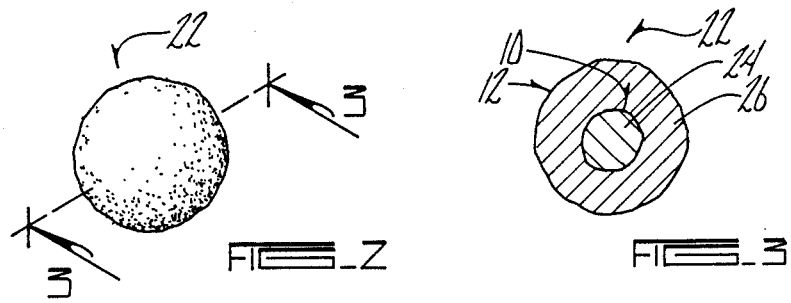

4,940,611

HARDENED, ENVIRONMENTALLY DISPOSABLE COMPOSITE GRANULES OF COAL CLEANING REFUSE, COAL COMBUSTION WASTE, AND OTHER WASTES, AND METHOD PREPARING THE SAME

Government Rights

This invention was made with Government support under Contract No. w-7504-Eng-82 awarded by the Department of Energy. The Government has certain rights in this invention.

BACKGROUND OF THE INVENTION (a) Field of the Invention

The present invention relates to a means and method for disposing of by-products of coal and coal combustion, and particularly relates to the formation of hardened, environmentally inert and disposable composite granules consisting of coal cleaning refuse and coal combustion wastes.

Substantial amounts of energy are produced by the combustion of coal. As with any energy-generating process, the coal combustion process results in by-products and waste, which must be dealt with.

The general composition of coal, and its by-products and wastes, present serious environmental problems, primarily to the air, streams and ground water. Combustion wastes primarily consist of fly ash which many times contains heavy metals which are highly damaging to the environment in the concentrations contained in fly ash. Concentrations of heavy metals in fly ash are often quite small, but their presence can become highly damaging to the environment because several of the heavy metals will segregate on the surface of the fly ash particles during the combustion and subsequent flue gas cooling.

The problem is exacerbated because of the tremendous volume of coal cleaning and coal combustion wastes generated annually in the United States. It is estimated that there is annually 100 million tons of coal cleaning refuse containing rejected unusable coal produced in the United States. In addition, it is estimated that coal combustion results in the production of 60 million tons of fly ash and 25 million tons (dry basis) of flue gas desulfurization sludge annually. Conventionally, because of the adverse environmental impact of such materials, the rejected coal refuse and combustion wastes are many times simply stockpiled at locations near the coal mining or combustion facilities. Leaching of the heavy metals occurs to the ground, and this contamination eventually enters the nearest open waterways, and ground water. It can then be carried and spread to wide areas. Also, exposure to the elements allows the wind to carry away finer particles which causes dusting of surface vegetation and structures, and contributes to air pollution. Additionally, the coal cleaning refuse may ignite and cause smoldering in the piles of material, which would in turn cause pollutants to enter the atmosphere.

There have been many attempts to deal with this important environmental problem. Some attempts involve trying to recombust the coal cleaning refuse and-/or co-combustion wastes, to diminish their quantity, and to reduce the potential impact on the environment. Other methods attempt to mix the coal cleaning refuse and combustion waste with other materials to reduce their environmental impact. None of these methods have proven to be entirely satisfactory from an environmental standpoint.

The present inventors previously developed a method for producing hardened granules made from coal cleaning refuse and coal combustion waste which proved to be durable and able to withstand environmental and chemical forces which generally break down or contribute to the environmental problems associated with coal combustion waste and coal cleaning refuse. That method first ground the coal cleaning refuse and then blended or mixed the ground coal cleaning refuse with coal combustion waste. This blended mixture was then put in a mechanism to form generally spherical granules of the mixture. Water or some other binding liquid was usually required to facilitate the binding. The granules were then sent to a furnace whereby they were combusted and sintered. The carbon content of the coal cleaning refuse and coal combustion waste comprised the combustible portion of the mixture and elevated the granules to sintering temperature. Upon cooling, the sintered mixture fuses together to form a hardened granule which is resistant to environmental factors and chemicals which would try to break the particles down.

A method has been discovered, however, which produces even more durable and harder granules which will further ensure safe environmental disposal of these coal combustion by-products and wastes. This improved method, set forth herein, represents an advance in the art and a solution to the serious environmental problems described above.

It is therefore a principal object of the present invention to solve or improve over the problems and deficiencies in the art.

Another object of the present invention is to provide a hardened, environmentally inert composite granule of coal cleaning refuse and coal combustion waste which stabilizes the constituent elements of those substances and is in a form which is easily handled and disposable.

A further object of the present invention is to provide a means and method as above described which is highly resistant to environmental degradation and chemical attack, and is nonleachable.

These and other objects, features and advantages of the invention will become more apparent with reference to the accompanying specification and claims.

SUMMARY OF THE INVENTION

The present invention includes hardened, environmentally inert composite granules of coal cleaning refuse and coal combustion waste, and the method for making the same. Coal combustion waste is processed into a pelletized or granulated form. Coal cleaning refuse is ground into fine particles. The pulverized coal cleaning refuse is then processed to coat or form a layer of coal cleaning refuse around the pelletized coal combustion waste.

These composite granules are then combusted, using the combustables in the granules, and then sintered. Finally, the granules are cooled which fuses the materials together and forms an extremely hard durable outer surface or shell of coal cleaning refuse, to complement an even harder core of coal combustion waste.

The resulting sintered composite granules are virtually impervious to the environment and chemicals, are able to resist the environmental cycles of freezing and thawing, are nonleachable, and are extremely hard to resist compression or other forces.

The granule form also allows the particles to be easily handled, transported, stored, or disposed of. It can therefore be seen that the invention achieves at least all of its stated objectives.

BRIEF DESCRIPTION OF THE DRAWINGS

FIG. 1 is a schematic of a process by which the composite granules are made.

FIG. 2 is a perspective view of a composite granule.

FIG. 3 is a sectional view taken along lines 3—3 of FIG. 2, showing the composite nature of the particles.

DETAILED DESCRIPTION OF THE PREFERRED EMBODIMENT

With reference to the drawings, a preferred embodiment of the present invention will now be described. This description is to assist in an understanding of the invention, but does not limit the invention.

FIG. 1 depicts in schematic form the method for producing hardened, environmentally inert composite granules of coal cleaning refuse and coal combustion waste pursuant to the present invention. Coal combustion waste 10, which is generally and primarily fly ash, such as is well known within the art, and coal cleaning refuse 12, also well known within the art, are retrieved and compiled from the combustion processes and coal cleaning, respectively. For purposes of simplicity throughout this description, coal combustion waste 10 will also be referred to as fly ash 10; and coal cleaning refuse 12 will be sometimes referred to as refuse 12.

Fly ash 10 is introduced to a rotary pan agglomerator 14 (hereinafter referred to as "agglomerator 14"). As is known in the art, agglomerator 14 serves to granulate or convert the unprocessed fly ash 10 into generally spherical pellets or granules. Water 18 is introduced to assist in forming the granules, which shall also sometimes be called core granules or cores.

The widely varying-in-size coal cleaning refuse 12 is fed into a pulverizer or grinder 16 which outputs finely ground particles of refuse 12. Particle size generally ranges, in the preferred embodiment, from a few microns to just over 1,000 microns.

The granulated fly ash 10, and the ground refuse 12 are then fed to a second agglomerator 15. Because of the nature of the finely ground refuse 12 and the pelletized or granulated fly ash 10, agglomerator 15 causes the pulverized refuse 12 to form a layer around the granules of fly ash 10. Water 19 is also fed to agglomerator 15.

It is to be understood that a binder 19 is generally required to facilitate the coating of pellets or core granules of fly ash 10 with the ground refuse 12. In the preferred embodiment, binder 19 consists of water which is introduced into agglomerator 15.

The combined composite pellets or core granules of fly ash 10 with the layer of refuse 12 are then introduced into combustion/sintering furnace 20. Furnace 20 is operated to raise the particles to sintering temperatures, and does so by utilizing the combustibles found within fly ash 10 and refuse 12. The process thereby includes the secondary combustion of the combustibles in the materials.

Finally, after sintering, the composite granules are output from furnace 20 and, of course, proceed to cool. The cooling causes fusion of the fly ash 10 and refuse 12, and causes hardening of these materials. Resulting composite granules 22 are extremely hard, durable, and environmentally inert. As previously described, they are superiorally resistant to environmental degradation and chemical attack. They are easily handled and transported. The invention therefore produces an advantageous solution to the disposal of coal combustion by-products and waste.

A representation of the actual composite granules 22 is depicted in FIGS. 2 and 3. FIG. 2 shows in perspective the generally spherical nature of the composite granules 22. In the preferred embodiment, the diameter of composite granules is generally around 12 millimeters. FIG. 3 shows the granule 22 of FIG. 2 in cross-section, and illustrates the core 24 of fly ash 10, with the shell 26 of refuse 12. In the preferred embodiment, the preferred ratio by weight of shell 26 to core 24 is three to one for optimal resistance to degradation. The diameter of core 24 therefore is preferred to be somewhere around four to six millimeters, compared to a 12 millimeter outside diameter of shell 26.

Some of the specifics for a preferred embodiment of the process of making composite granules 22 is as follows. Generally, refuse 12 contains a number of elements such as silicon (Si), aluminum (Al), iron (Fe), and calcium (Ca); along with some clay, water, carbon, and both organic and inorganic sulfur. Refuse 12, from coal combustion plants, comes in various sized lumps, the largest of which being generally of a diameter of three inches.

On the other hand, fly ash, as collected, is generally vitreous and roughly spherical. Fly ash from subbituminous coal is, however, somewhat cemetitious. On the other hand, fly ash from bituminous coal is magnetic because of its sometimes up to 15% iron oxide content, and therefore has fluxing properties. Both of these properties are helpful in forming core granules of fly ash 20.

It should be understood that if needed, either fly ash 10 or refuse 12 can be pre-dried before further processing. In particular, it may be beneficial to dry refuse 12, which sometimes contains 20% moisture. It is preferred that drying of refuse 12 be from 20% moisture down to approximately 4% moisture before grinding.

In the preferred embodiment, grinding was accomplished by utilizing a Holmes hammer mill. Refuse 12 was passed through the hammer mill twice to achieve the desired output. The hammer mill was equipped on the first pass with a screen having 3/16th inch circular holes. The second pass was with a screen of 1/16th inch circular holes. The resulting product had a weighted average diameter of approximately 330 microns.

It is also beneficial, for optimum operation of the process, that the combined fly ash 10 and refuse 12 contain between 5% and 10% carbon to facilitate sufficient sintering combustion.

Rotary pan agglomerators 14 and 15, in the preferred embodiment of the invention, were Agglo-Miser, 36 centimeter pan, ½horsepower, pan agglomerators available from Mars Mineral Corporation. Each could also be equipped with a Syntron Model FTOC vibratory feeder available from FMC Corporation. As is well known in the art, a rotary pan agglomerator rotates a pan containing the materials to be agglomerated at an inclined angle. The various factors which affect the output of the pan agglomerator 15 are the particle size of refuse 12, the ratio of refuse 12 to fly ash 10, the amount of water added as a binder 19 (if any), residence time of the fly ash 10 and refuse 12 in the agglomerator 15 (otherwise known as feed rate), and the angle of inclination and revolutions per minute (rpm) of agglomerator 15.

Binders 18 and 19 (water in the preferred embodiment) were added into agglomerators 14 and 15 by an automatic spray system. Alternatively, binder could be added by some other type of system, such as is well within those of ordinary skill in the art.

In the preferred embodiment, the following parameters were found to be optimal for operation of the invention. It was preferred that moisture content be between 15% and 21%; and preferably 17% to 18% by weight. The angle of the pan of agglomerator should be between 45° and 55° from horizontal; and preferably 50°.

For the agglomerator 15 used in the preferred embodiment, a feed rate of 15 to 60 grams per minute of fly ash 10 and refuse 12 is preferred, with 15 to 30 grams per minute being optimal.

It is to be understood that a 3:1 weight ratio of refuse 12 to fly ash 10 is preferred for the composite granules coming out of agglomerator 15. While the diameter of the core 24 is not limited, tests show that between diameters of 2, 4, 6, and 8 millimeters, the smaller core diameters resulted in the highest resistance to fracture. However, a six millimeter core for a 12 millimeter diameter granule resulted in a refuse to fly ash ratio of three, which is preferred.

The combustion/sintering of the fly ash granules with a layer of refuse will now be described. As previously mentioned, the carbon content of the materials allows combustion of the materials. This combustion raises the materials to sintering temperature. Sintering of compacted, finely-divided, dry solid particles consists of heating the mass to a temperature where the particles become molten at the points of contact. The coal and carbon material present in the materials (especially the refuse 12) burns during this step, raising the mass of materials to the sintering temperature. Table I below sets forth the changes which occur as a function of temperature during the combustion/sintering of the materials in furnace 20, and particularly the coal refuse 12:

TABLE I

| Change occurring | Temperature Range, °C. |
| --- | --- |
| Drying and removal of free water | Up to 200 |
| Absorbed water dehydration | 200 to 480 |
| Chemically combined water dehydration | 480 to 700 |
| Oxidation of iron, sulphur, carbon, etc. | 500 to 1000 |
| Dissociation-reduction of carbonates, sulphates and ferric to ferrous state | 500 to 1000 |
| Vitrification-glass formation | 900 to 1300 |
| Pyroplastic condition-bloating of clays/shales | 1150 to 1320 |
| Melting-loss of vesicular structure and shape | 1300 to 1500 |

It was found that a sintering temperature of approximately 1050° was optimum for the combustion/sintering process. Sintering temperature of over 1100° caused some cracks to develop in the granules.

In the preferred embodiment, granules of approximately 12 millimeter diameter with a fly ash core diameter of 6 millimeters were tested. These composite granules were sintered for one hour at an air rate of 10 liters/minutes (1 ATM, 20° C.).

After the sintering process, the composite granules were removed from furnace 20. As they cooled, the particles bonded together to produce the final sintered composite granules.

The included preferred embodiment is given by way of example only, and not by way of limitation to the invention, which is solely described by the claims herein. Variations obvious to one skilled in the art will be included within the invention defined by the claims.

What is claimed is:

1. A method for preparing hardened, environmentally disposable composite granules of coal cleaning refuse and coal combustion waste comprising:
    forming roughly spherical granules of coal combustion waste; pulverizing coal cleaning refuse; binding a layer of pulverized coal cleaning refuse to the coal combustion waste granules;
    combusting and sintering the combined coal combustion waste granules with the outer layer of pulverized coal cleaning refuse to form hardened, environmentally inert and disposable composite granules of coal cleaning refuse and coal combustion waste.

2. The method of claim 1 wherein liquid is used to bind coal cleaning refuse to the combustion waste pellets.

3. The method of claim 2 wherein the liquid comprises water.

4. The method of claim 2 wherein the liquid comprises liquid waste, and in particular, blow-down from coal combustion process.

5. The method of claim 1 wherein combustion is facilitated by the combustibles found within the coal cleaning refuse and combustion waste.

6. A composite granule of coal cleaning refuse and coal combustion waste produced by the following process:
    forming a core of the coal combustion waste;
    pulverizing the coal cleaning refuse into generally fine-sized particles;
    binding the pulverized coal cleaning refuse as an outer layer to the coal combustion waste core;
    combusting and sintering the combined coal combustion waste core with the outer layer of coal cleaning waste; cooling the combined core and outer layer to form a hardened, environmentally inert and disposable composite granule.

7. The product by process of claim 6 wherein the percentage of coal combustion waste for the composite granule is 10% to 50%.

8. The product by process of claim 6 further comprising adding water to the pulverized coal cleaning refuse to assist in binding it to the coal combustion waste core.

9. The product by process of claim 8 wherein the percentage of water to the total weight of the composite granule is 15% to 25%.

10. The product by process of claim 9 wherein the percentage of water to total weight of the composite granule is 17% to 18%.

11. The product by process of claim 6 wherein the coal combustion wastes are formed into pellets in a pan agglomerator.

12. The product by process of claim 11 wherein the pan agglomerator is operated at an angle between 45° and 55°.

13. The product by process of claim 12 where the pan agglomerator is operated at an angle of 50%.

14. The product by process of claim 11 wherein the feed of coal combustion waste to the pan agglomerator is between 15 and 60 grams per minute.

15. The product by process of claim 14 wherein the feed of coal combustion waste to the pan agglomerator is 15 grams per minute.

16. The product by process of claim 6 wherein the combined coal combustion waste cores with outer layers of coal cleaning refuse are sintered at between 800° and 1200° C.

17. The product by process of claim 16 wherein sintering temperature is 1050° C.

18. The product by process of claim 6 wherein the general ratio of coal cleaning refuse to coal combustion waste is three to one.

* * * * *